July 13, 1965  H. E. KEYES  3,194,653
COPPER RECOVERY PROCESS
Filed May 6, 1963  2 Sheets-Sheet 1
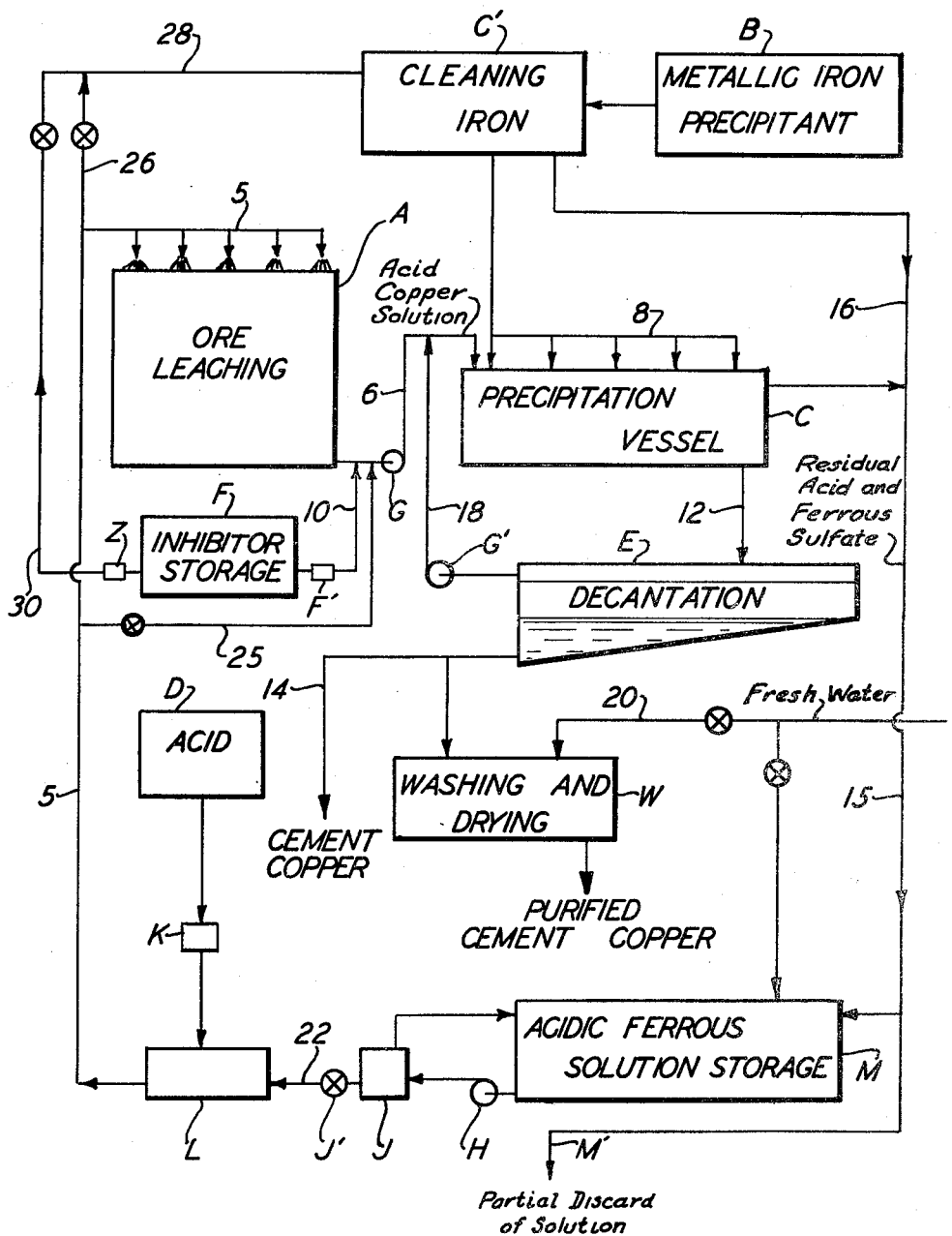
FIG. I.
Harmon E. Keyes
INVENTOR.
BY Knight & Rodgers
Attorneys.

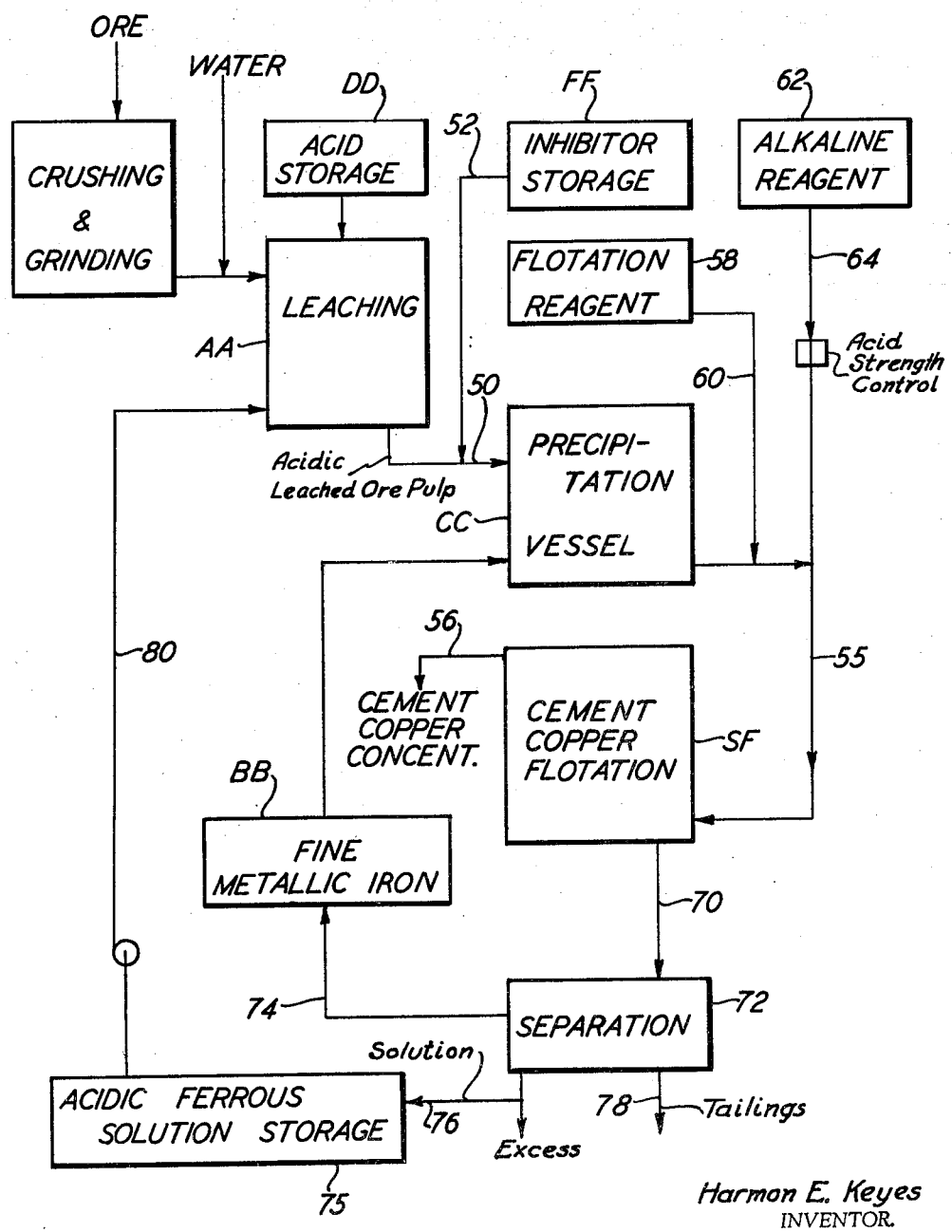
FIG.II.

3,194,653
COPPER RECOVERY PROCESS
Harmon E. Keyes, 508 E. Culver St., Phoenix, Ariz.
Filed May 6, 1963, Ser. No. 278,260
9 Claims. (Cl. 75—109)

This invention relates to the recovery of copper in metallic form, as a product of a process for extracting copper from an ore, and more particularly to the maximum recovery of high quality metallic copper in finely divided form generally known in the trade as cement copper.

The so-called cement copper is produced by precipitation of metallic copper from an acid solution of a copper salt by a metal which replaces the copper in the solution. Commonly, the copper to be recovered is first obtained as copper sulfate dissolved in aqueous sulfuric acid, commonly known as pregnant solution, and metallic iron is introduced into the acidified pregnant copper solution which usually is at least as concentrated as pH 4. The iron goes into solution as sulfate and the copper precipitates as finely divided metallic copper which is the so-called cement copper. The iron may be iron scrap such as tin cans which preferably have been de-tinned and cleaned of oxide or other contaminants. Clean iron is essential to obtaining highest purity copper and a cleaning operation is often necessary as a preliminary step in the process. Iron turnings, sponge iron, steel scrap and other forms of iron waste, preferably in more or less finely divided form to present a large surface area, may be used in the present process.

A serious objection to the production of cement copper as heretofore practiced is that there is a large waste of both iron and acid in the copper-acid solution, or a large loss of copper in the ore tailings if complete acid neutralization is attempted during acid leaching of the ore without counter-current action, to the extent that the copper loss and the consumption of acid and iron are economically unsound and from a commercial standpoint render the operation excessively expensive under many conditions.

It is an object of this invention to reduce the loss of iron going into solution and the acid lost by reaction with the iron. It is also an object to improve the recovery of copper from the ore by carrying stronger acid through the ore and into the pregnant solution, and to recover substantially all of the copper from the pregnant solution as metallic copper.

It is a further object of the invention to increase the purity of the precipitated copper, by preliminary cleaning of the iron, and also preventing precipitation of basic iron compounds during cementation and subsequent washing, thus obtaining a substantially pure metallic copper that may be further processed economically as it is suitable for working into marketable products without going through the usual smelting operation.

Still another object is to improve the settling and filtering rates of the cement copper sludge, thus lowering its moisture content and cheapening further processing.

A further object is to produce a dense, flaky type of cement copper, which condition is advantageous in some subsequent processing for special purposes. Such copper is readily dislodged from the metallic iron by mild abrasion, as by tumbling in a drum.

I have made the surprising discovery that, by the addition of control agents to the acid solution of the copper to be recovered, at normal ambient temperatures, the consumption of the precipitating metal beyond that required for copper replacement is almost eliminated or at least greatly reduced, and I have further discovered that, at the same time, the copper precipitated reaches an almost maximum degree of purity and percentage recovery. Also, by maintaining adequate minimum acidic conditions, by aid of the control agents during cementation, oxidation of ferrous sulphate is retarded, and hydrolysis and precipitation of basic iron compounds in the precipitator are prevented, thus enhancing the purity of the cement copper. Thus, the precipitated copper may have a purity in excess of 90% purity, such as 99%, and the copper recovery from the solution is in excess of 98%.

The control agents are in the nature of acid-corrosion inhibitors for the acids and metals employed. Such corrosion inhibitors are well known in various industries, and there are many of them.

Having reference to sulfuric acid as the acid used in conjunction with metallic iron to precipitate metallic copper from acid copper sulfate solutions, many appropriate corrosion inhibitors appear generally to be organic compounds and in many instances to contain nitrogenous materials and in other instances contain sulfur bearing compounds. For example, I have used bone oil as the inhibitor in precipating the desired metallic copper from a sulfuric acid solution of copper sulfate with metallic iron. Bone oil is a well known article of commerce and is obtained by the distillation of bones; its principal effective constituents apparently are derivatives of pyridine, aniline, methylamine and other similar compounds. Cinchona bark alkaloids such as disclosed in U.S. Patent No. 1,742,986, and sulfurized cinchona bark alkaloids such as disclosed in Patent No. 1,908,773 have been known and used for these purposes for many years. Others contain amino and nitrile groups. For example, fatty monamines and diamines are useful, such as

R—NH$_2$CH$_2$CH$_2$CH$_2$NH$_3$ where R represents long hydrocarbon chains from tallow and coconut fatty acids. Other usable inhibitors for this purpose are dialkylthioureas such as 1,3-diethyl and dibutylthioureas, these being also useful with hydrochloric acid, phosphoric acid, sulfamic acid, oxalic acid, and so on, according to the manufacturers' instructions. All these are indicated in practice to be highly effective with acid concentrations around 10% and less, when used in amounts of 1% down to about 0.02% of the inhibitor based on the amount of solution by either weight or volume. Generally they are intended to be used at temperatures under about 160° F., as their effectiveness generally decreases at higher temperatures. However, this invention generally uses inhibitors at ambient or slightly elevated temperatures, and in even lower acid concentrations than just stated.

Also known for these purposes are quinoline, 2,6-dimethylquinoline, alpha and beta naphthoquinolines, 1-ethylquinoline, thiourea, methylthiourea, ethylthiourea, and o-, m-, and p-polythioureas.

Corrosion inhibitors for the present purpose, that is acid-corrosion inhibitors to protect iron or other precipitant metal against appreciable consumption by the acid, are agents which do not react chemically with the iron and are not themselves consumed, but nevertheless act to protect the surface of the metal against significant corrosion by the acid. At the same time, I have discovered that the inhibitors do not prevent the replacement of the copper in solution by iron derived from the metallic iron, and in many cases do not retard but in some cases actually promote the deposition of copper by metallic iron.

A discussion of acid corrosion inhibitors is found in "Corrosion Handbook" edited by Dr. Uhlig of Massachusetts Institute of Technology and published in 1948 by John Wiley & Sons. In an article entitled "Inhibitors and Passivators" by Eldredge and Warner (of Shell Development Co. and Carnegie Institute of Technology, respectively) it states with respect to pickling of iron and steel that in recent years, organic type inhibitors have been quite universally used to decrease acid attack in the basis metal without altering the rate of scale removal. I have also discovered that the acid corrosion inhibitors may be used as such without preventing the displacement of copper in solution by iron.

At page 905 these authors state, "Any substance which, when added in small amounts to the corrosive environment of a metal or an alloy, effectively decreases the corrosion rate, is termed an inhibitor."

At page 909 the articles goes on to discuss inhibitors more fully stating, "It seems evident that an organic pickling inhibitor must consist of a hydrocarbon part attached to a polar or ionizable group. In general, they contain nitrogen, oxygen, sulfur, or other elements of the fifth and sixth groups of the Periodic Tables and are compounds such as amines, mercaptans, heterocyclic nitrogen compounds, substituted ureas and thioureas, sulfides, aldehydes, etc."

The article also list about 150 different inhibitors, the majority of which are considered to be more than 50% effective to protect the basis metal against corrosion. I have used a number of these inhibitors.

I have made the further discovery that precipitated copper produced by this method may be separated by selective mineral flotation, and that this may be accomplished by employing both a torrosion inhibitor and a flotation agent in the same stage, especially where the same constituent performs both functions as is true with the above described bone oil. Here, both precipitation and flotation are carried on in the same vessel, and in fact may be carried on simultaneously. The precipitated cement copper is thus floated off from residual metallic iron used as the electropositive precipitating metal. The cement copper may also be selectively floated off from ore pulp obtained from grinding and leaching steps. In addition to bone oil, any other appropriate agent performing both functions may be used.

I have made the further discovery that acidic iron sulfate solutions from the precipitated copper stage and from other stages may be very beneficially recycled from these stages whereby further to use the inhibitor contained therein and also to use the residual acid and iron sulfates, adding make-up acid as need be to reach desired acid strength while at the same time obtaining the same high percentage recovery and purity of copper along with the same conservation of acid and precipitating iron.

Other objects and features of this invention will become apparent to those skilled in this art upon reference to the following specification and the accompanying drawings wherein:

FIG. I is a flow sheet illustrating diagrammatically how metallic copper is precipitated from an acid leaching solution of copper by metallic iron as a base metal in the presence of an acid-corrosion inhibitor, and the precipitated copper is then separated by decantation or equivalent procedure; and FIG. II is a flow sheet diagrammatically indicating how metallic copper is precipitated from a leached copper ore pulp in the presence of an acid-corrosion inhibitor and metallic iron as the precipitant base, the precipitated copper being separated from the ore pulp by selective froth flotation.

In the system indicated in FIG. I, copper is leached from a copper ore, as in a vessel A, or alternatively in an ore heap or waste dump, through the medium of an appropriate sulfuric acid solution fed by a distributor line 5 from an acid storage tank D as by way of a feeder K and a mixing box L. The acidic copper solution is passed from the leaching vessel A by a line 6 and a pump G to a precipitation vessel C into which metallic iron is supplied as a precipitant from iron storage B as by a distributor 8. If desired, the iron is conveniently in the form of shredded "tin" cans which may be detinned and otherwise cleaned or prepared by intermediate passage through suitable cleaning apparatus C', such as by tumbling in a drum in contact with acid.

The inhibitor of this invention is fed from inhibitor storage F, as by means of a feeder F' and a line 10, to the pump G and line 6 to be mixed with the copper solution passing to the precipitation vessel C. In the vessel C, the copper of the solution from the solution vessel A is slowly precipitated on the iron scrap in the presence of the acid and the inhibitor. After an appropriate period of time, which may vary, for example, from one-half hour to ten hours or more, according to plant conditions, the undissolved scrap iron is agitated, as by tumbling, to dislodge the precipitated copper which, under these conditions, is a coarse granular copper that will readily pass out with the solution from the residual iron in the vessel C through a line 12 into an underlying decantation vessel E in which it will settle and drain rapidly. Sponge iron precipitates copper in a comparatively short time. Fine metallic iron may be separated from cement copper in any suitable way if desired to increase the purity of the copper product.

Since the precipitated or "cement" copper may also be readily filtered at this stage, the vessel E may also include a filter. In either event, the purified copper thus recovered may be either passed to washing and drying apparatus W or directly recovered at 14 for disposition as the product of the procedure.

As illustrated, the residual acid and ferrous sulfate solution in the precipitation vessel C is drawn by a line 15 to an acidic ferrous sulfate solution storage M for further use, since the residual acid and the inhibitor still have much value. Provision is made for periodic discarding of ferrous sulphate solution at M' to keep solution volume and concentration in balance, when necessary. If desired, acidic cleaning solution from the cleaning apparatus C' (usually containing inhibitor) may also be passed by a line 16 to the line 15 and to storage M. In a somewhat similar manner, the smaller volume of solution from the decanter E (or filter) may later be pumped by a pump G' through a line 18 to the copper solution line 6 to mix with a new copper solution batch to be treated in the precipitation vessel C. Use of the stored residual acid and inhibitor solution in storage M is made as required. Thus, it may be diluted from a branched valved fresh water line 20 which may supply also the washer W. This solution is fed for use as by a pump H to a circulating control box J or the like, whence it leads through a regulating valve J' and a line 22 to the previously mentioned mixing box L which is supplied with fresh acid from the acid storage D by the feeder K.

The acid line 5, which supplies the leaching apparatus A, may feed a valved branch line 25 leading to the copper solution line 6 for the purpose of fortifying the copper solution to provide adequate pH value for the copper precipitation stage in the precipitation vessel C. In addition, the acid line 5 may supply a valved branch line 26 for feeding acid solution to the cleaning apparatus C'. Similarly, valved inhibitor line 30 may serve to feed inhibitor from the inhibitor storage F via a feeder Z to a common line 28 leading into the cleaning apparatus C'.

Concerning concentrations of the various constituents involved, as to copper concentrations obtained in copper solutions prepared commonly by the ore-leaching procedures above indicated and similar procedures, the copper content usually may be considered low, such as 0.1% to 3% copper calculated as metal. However, much greater copper contents do not in any way hinder the functioning of the present processes.

Respecting the acid content of the final pregnant solution going to precipitation, such as that of the preferred sulfuric acid, this usually need not exceed about one-fourth (by weight) of the copper content. It may, however, be more. Control of the acid content probably is best effected through regulation of the pH value during precipitation, which should be between about pH 1.4 and pH 3, such as about pH 2.5, for optimum operating conditions in precipitating metallic copper with the base metal such as iron. Greater acidity is ordinarily acceptable under my conditions, such as pH 1.4 or less (numerically), inasmuch as the acid-corrosion inhibitor is always employed, and because appreciable free acid, as later defined, is maintained to avoid the precipitation of iron compounds (iron hydroxide, for example, as mentioned below) and to yield the high purity, particle coarseness and granular characteristics desired in the recovered precipitated or cement copper product. Acid may also be computed on the basis of grams per liter. For example, a pH value of 2.5 is reached with .15 grams per liter of sulphuric acid (assuming 100% ionization) amounting to about .015% (by weight) of the overall solution. However, in view of the presence of acid-corrosion inhibitor to protect against excess solution of the iron precipitant, higher percentages such as up to about 5% by weight of the overall solution might be used if desired for any reason, although normally an acid content of about 0.25% (about 1.3 pH) will offer no particular additional advantage in copper precipitation and may in some cases unduly increase costs by unnecessarily high acid loads in the various parts of the system. An initial acidity such as pH 2.5 to pH 2.0 that will not reduce below about pH 3.5–4 at the end, unless make-up acid is to be added during the copper precipitation, will be preferable. The initial acidity is established to maintain this minimum under conditions encountered, and the acidity drops but little in the precipitation procedure because of the presence of the inhibitor which conserves the acid.

The amount of iron supplied to the precipitation stage is necessarily that which is thoroughly adequate to precipitate practically all the copper. This should be at least somewhat more than on an aliquot parts basis, i.e., an "excess" of iron. In normal cementation using a form of scrap iron, the copper solution passes through a large bed providing excess iron, necessary make-up iron being supplied periodically in weight ratio of between about 1:1 to 2:1 metallic iron to metallic copper to be precipitated. In case of precipitation of copper with sponge iron a desired excess of sponge iron is continuously fed with the copper solution.

The concentration of the inhibitor to be used is very small, whether of the non-frothing type or the frothing type. Thus, the inhibitor may be less than about 0.5% of the copper solution, or within a range of about 0.005% to 0.5% based on the acidified copper solution bath. There appears to be nothing critical about the proportions of inhibitor (as is also true of the other constituents employed) and often larger or smaller concentrations may be employed effectively. One pound of inhibitor per ton of solution (0.05%) is commonly quite acceptable, but any smaller effective proportion may be used. Similarly, much larger proportions may be used, such as 4 or 5 pounds per ton; but since these usually offer no added advantage, such larger amounts merely increase the cost. In any event, the optimum proportion of inhibitor varies from one to another and can ordinarily be ascertained for each inhibitor from information supplied by the manufacturer of the inhibitor.

Pregnant copper solutions suitable for delivery to precipitation vessel C for precipitation of copper, may and often do contain iron as sulfate in the ferrous or ferric state or both. In contact with metallic iron, the ferric iron is quickly reduced to ferrous and metallic iron is dissolved in the reduction reaction. This occurs before much copper is precipitated since ferric sulfate also dissolves cement copper readily, also reducing the ferric iron to ferrous.

Ferrous sulfate thus formed may be oxidized by air to the ferric state in the precipitation vessel C. This oxidation is retarded by the presence of free acid, greater acidity having a greater retarding effect. Hence, the presence of acid is the precipitation step tends to prevent oxidation of iron at this stage. Such oxidation of ferrous sulfate also uses up acid since $2FeSO_4$ going to $Fe_2(SO_4)_3$ requires an extra sulfate radical obtained from the acid present. Without free acid present, oxidation of ferrous sulfate by air produces some ferric hydroxide that precipitates and may carry with it considerable iron sulfate. The ferric sulfate produced reacts with the metallic iron, as stated before, to produce more ferrous sulfate which is in turn oxidized by air to produce more ferric hydroxide. It is advantageous to insure the presence of free acid corresponding to a pH value of 2 or less (i.e., .49 gram per liter or more of acid) to retard such oxidation and prevent precipitation of ferric hydroxide, however, the minimum acidity required to obtain these results is in the vicinity of pH 3.5–4.0. One of the advantages of my invention is the elimination of ferric hydroxide since it precipitates out and not only uses up iron but contaminates the cement copper requiring subsequent processing to remove it and obtain copper of high purity.

As an example of the foregoing procedures, the copper ores are leached with a solution containing originally approximately 10 grams per liter (1.0% by weight) of sulfuric acid, producing a pregnant solution containing 0.5 gram per liter (0.05% by weight) of sulfuric acid. Inhibitor is provided by adding to the pregnant solution bone oil in the amount of 2 lbs./ton of solution (.1% by weight). At ambient temperature of 65°–70° F., the acidified solution is kept in contact for four hours with detinned and shredded cans having a weight of ten times the weight of copper to provide the desired "excess" of iron. The copper precipitate is then detached from the iron by agitating the mass and the cement copper removed from the residual iron along with the residual acid solution. The cement copper is then drained, washed with water, and dried.

As examples of the effectiveness of inhibitors at high acid concentrations, the following test data are given. Test A was with bone oil and test B was with "Grasselli Inhibitor No. 8" which is a sulfurized cinchona bark alkaloid (see Patent No. 1,908,773). Both inhibitors were at a concentration of .42 lb. per ton of solution or .021%. The original copper solution contained 8.35 grams per liter of $H_2SO_4$ and 12.80 grams per liter of Cu. All values below are in grams per liter.

Table I

| Test | Time, hrs. | Control—No Inhibitor | | | Inhibited Solution | | |
| --- | --- | --- | --- | --- | --- | --- | --- |
|  |  | $H_2SO_4$ | Fe | Cu | $H_2SO_4$ | Fe | Cu |
| A | 2 | 5.5 | 13.1 | .063 | 7.5 | 12.1 | .063 |
| B | 2½ | 2.3 | 15.1 | tr. | 6.6 | 12.6 | tr. |

These figures show that starting with 8.35 grams per liter of acid, in the inhibited solutions only 10.2% and 21% of the acid was consumed in tests A and B respectively, while in the control solutions 34% and 72% of the acid was consumed under comparable conditions. Hence, the acid saving is demonstrated. Also that the inhibitors are effective at higher acidity than normally used, and without preventing precipitation of copper.

Some care is required to interpret properly the above data with respect to iron savings (or loss) since the influence of the iron consumed by the copper masks the effectiveness of the inhibitor in this respect. The iron consumption by the acid is stoichiometrically equal to $56/98$ times the acid loss. This can be relied on under this procedure. The theoretical loss or result can be compared directly to the iron loss determined by the test when, as here, the copper precipitation is of approximately the same amount. Therefore, the weight of iron saved is equal to $56/98$ times the weight of acid saved. Comparison of calculated and actual values based on tests A and B above are provided by the following table.

Table II

| Test | Acid Saved, gm./l. | Iron Saved, gm./l. | |
|---|---|---|---|
| | | Calculated | Actual |
| A | 2.0 | 1.14 | 1.0 |
| B | 4.3 | 2.46 | 2.5 |

The theoretical minimum consumption of iron by replacing copper is approximately $^{56}/_{63}$ or 0.89 gm. of metallic iron consumed for each gm. of copper precipitated. The comparable iron consumption in tests A and B above is shown in Table III in terms of the ratio $$\frac{\text{grams of iron dissolved}}{\text{grams of copper precipitated}}$$

Table III

| Test | Control, No Inhibitor | Inhibited Solution |
|---|---|---|
| A | 1.03 | .95 |
| B | 1.18 | .98 |

One of the observed advantages with the inhibitors, especially the sulfurized cinchona bark alkaloid, is that the copper is precipitated copper and is in a dense, bright, flaky form easily dislodged from the iron by mild agitation effected by tumbling in a drum.

A flotation adaptation of this same method of precipitating metallic ("cement") copper from an acid solution with acid-corrosion inhibitor, in the presence of a base precipitating metal such as iron, is diagrammatically outlined in FIG. II. Here, copper ore is crushed and ground and is then leached in appropriate apparatus AA to produce a typical flotation pulp with water added as indicated. To this pulp sulfuric acid is added in appropriate proportions from an acid supply DD. The acid-leached ore pulp, with required excess acid as previously described for precipitation purposes, is then passed in a stream, as by way of a line 50, to a copper precipitation vessel CC through which the pulp may be pumped as required.

Inhibitor is supplied from storage FF to the pulp, in proportions as previously indicated, as by way of a line 52 leading into the line 50. Metallic precipitant, such as finely divided iron, is passed from storage BB by any suitable means to the precipitation vessel CC and into contact with the acidified ore pulp therein whereby to precipitate the dissolved copper as before. The inhibited acid pulp with fine precipitant metal from the vessel CC is then passed to a selective flotation apparatus SF via a line 55 or the like. Copper precipitation may be completed batchwise in the vessel CC and the batch then passed to the flotation stage, or precipitation caused to occur progressively in the vessel CC, the line 55 and the flotation apparatus SF during flotation. In some special cases, as with sponge iron precipitant or a special frothing inhibitor, flotation of the precipitated copper may be effected as precipitation takes place, flotation and precipitation thus occurring simultaneously. The floated copper concentrate is withdrawn from flotation as by a conventional launder 56, and the metallic cement copper recovered therefrom as the product. Any conventional flotation agent well known in the trade, such as pine oil or terpineol frother with suitable collector reagent or the like, is fed to the flotation stage from a supply 58 as by a line 60 which may discharge into the pulp line 55 and be thus fed to the flotation apparatus SF. Should the acidity of the pulp undergoing flotation require reduction for any reason, an alkaline agent may be added to the flotation pulp from a supply 62 as by way of a line 64 discharging into the pulp line 55. Where bone oil is used as the inhibitor, it acts also as the flotation frothing and collecting agent in the relatively small amounts indicated, and no neutralization or reduction of the acid content in the pulp is required.

It also is possible with my invention to apply flotation to further purify cement copper produced from clear solution as in FIG. I. In this case the clear pregnant copper solution is separated from the ore in the apparatus AA, FIG. II, and acidic clear solution is fed to precipitator CC. In this special case the ore tailings are discarded upon leaving AA.

As in the process of FIG. I, the acid and inhibitor may be recovered for further use by separation from the tailings after flotation. Thus, the tailings from flotation will be passed, as by a line 70, to separation apparatus 72 wherein residual metallic iron is reclaimed and returned to the iron storage BB by means 74. Iron separation may be made magnetically. The acidic iron solution is separated and passed to acid solution storage 75 by a line 76 and the tailings are sent to the dump at 78. Acid solution for reuse is conducted when needed from the storage 75 by a line 80 to the leaching apparatus AA or other destination as required.

Where appropriate or desirable, instead of employing iron as the precipitant or base metal, other metal electropositive to copper, such as aluminum or zinc may be employed. Similarly, another strong acid, or mineral acid, such as hydrochloric acid, may be used rather than sulfuric acid. Other possible acids are sulfurous acid and sulfamic acid. Here again, acid-corrosion inhibitors will be employed as previously indicated, as will appropriate acid concentrations, and the other controls described.

Under some conditions of leaching, the free acid in the pregnant copper solution going to precipitation may be too low to establish the desired conditions for my process. This may occur with leaching with ferric sulfate, sulfurous acid or sulfamic acid. It may even occur with sulfuric acid if the acid is partially or substantially neutralized during ore leaching. In such cases, I add sulfuric acid in a quantity sufficient to raise the acidity to within the approximate range of pH 2.7 to 1.4 (about .10–2.0 grams per liter of $H_2SO_4$ respectively). This degree of acidity attains the advantages of my process. Inhibitor is added at a suitable time.

I claim:

1. A method for producing metallic copper including the steps of:
   producing in acid solution a copper salt of such acid;
   contacting such solution with a metal electro-positive to copper to precipitate the copper of the solution in metallic form on the electro-positive metal;
   and supplying to said solution undergoing precipitation an acid-corrosion inhibitor for such acid comprising an organic compound to inhibit attack of the electro-positive metal by the acid and yield granular copper particles readily separable from the electro-positive metal and solution.

2. A method as in claim 1 that includes the step of tumbling the electro-positive metal after copper is precipitated thereon to dislodge the copper particles.

3. A method as in claim 1 wherein the acid solution during the precipitation step has an acidity between about pH 1.4 and pH 4.

4. A method as in claim 1 including an additional step of separating the precipitated particles of copper from the solution and the electro-positive metal by selective flotation.

5. A method as in claim 1 wherein the acid solution during the precipitation step has an acidity between about pH 1.4 and pH 4 and has an inhibitor content between about 0.005% and 0.5%.

6. A method as in claim 5 wherein the acid is sulfuric acid.

7. A method of producing metallic copper including:
   leaching a quantity of copper ore with sulfuric acid to produce copper sulfate in aqueous solution stronger in acid than pH 4;

contacting the copper solution with metallic iron to precipitate metallic copper;

supplying in the solution undergoing precipitation an acid-corrosion inhibitor for the acid and iron comprising an organic compound to inhibit attack of the acid upon the iron and promote maximum copper precipitation in a readily separable granular form;

and recovering the precipitated copper from the residual solution and iron.

8. A method as in claim 7 wherein the leached ore is ground ore formed into an aqueous pulp with the leaching solution; the pulp is subjected to the precipitation step; the precipitated copper is separated from the pulp by selective mineral flotation; and the acid solution from the flotation stage is returned to the leaching stage.

9. A method for producing metallic copper including:
producing a copper salt in acid solution;
contacting such solution with metallic iron to precipitate the copper as metallic copper;
adding sufficient acid to the copper salt solution to prevent precipitation of iron hydroxide while in contact with metallic iron;
and supplying to said solution an acid-corrosion inhibitor comprising an organic compound to limit attack by the acid upon the metallic iron.

References Cited by the Examiner

UNITED STATES PATENTS

| | | | |
|---|---|---|---|
| 2,111,575 | 3/38 | Stack | 75—117 |
| 2,130,278 | 9/38 | Keyes | 75—109 |
| 2,245,217 | 6/41 | Mowlds | 75—109 |
| 2,716,600 | 8/55 | Frick | 75—2 |
| 2,853,380 | 9/58 | Evans | 75—109 |

FOREIGN PATENTS 139,775  12/50  Australia.

OTHER REFERENCES

Butts: Copper, Reinhold Publishing Corp., New York, 1954, pages 68–71.

Uhlig: The Corrosion Handbook, John Wiley & Sons, Inc., New York, 1948, pages 905–916.

BENJAMIN HENKIN, *Primary Examiner.*

DAVID L. RECK, *Examiner.*